United States Patent
Okada

(10) Patent No.: US 8,433,497 B2
(45) Date of Patent: Apr. 30, 2013

(54) FUEL INJECTION CONTROL APPARATUS FOR INTERNAL COMBUSTION ENGINES

(75) Inventor: Syota Okada, Anjo (JP)

(73) Assignee: Denso Corporation, Kariya (JP)

(*) Notice: Subject to any disclaimer, the term of this patent is extended or adjusted under 35 U.S.C. 154(b) by 426 days.

(21) Appl. No.: 12/791,287

(22) Filed: Jun. 1, 2010

(65) Prior Publication Data

US 2010/0305836 A1    Dec. 2, 2010

(30) Foreign Application Priority Data

Jun. 1, 2009 (JP) ................................. 2009-132007

(51) Int. Cl.
B60T 7/12 (2006.01)
(52) U.S. Cl.
USPC ........... 701/103; 701/105; 701/115; 123/299; 123/434
(58) Field of Classification Search .......... 701/103–105, 701/114, 115; 123/435–437, 674, 675, 294, 123/299, 304, 305
See application file for complete search history.

(56) References Cited

U.S. PATENT DOCUMENTS

| | | | | |
|---|---|---|---|---|
| 6,755,176 B2* | 6/2004 | Takeuchi et al. | ............... | 123/299 |
| 7,513,245 B2* | 4/2009 | Morimoto et al. | ........ | 123/568.11 |
| 7,677,092 B2* | 3/2010 | Ishizuka et al. | ............. | 73/114.45 |
| 7,835,850 B2* | 11/2010 | Nakata et al. | ................. | 701/104 |
| 7,870,845 B2* | 1/2011 | Sasaki et al. | ................... | 123/435 |
| 7,921,706 B2* | 4/2011 | Sumitani | .................... | 73/114.69 |
| 7,921,707 B2* | 4/2011 | Ishizuka et al. | ............ | 73/114.74 |
| 2005/0092300 A1 | 5/2005 | Asano et al. | | |
| 2006/0293828 A1 | 12/2006 | Ishizuka et al. | | |
| 2009/0254261 A1 | 10/2009 | Inoue et al. | | |

FOREIGN PATENT DOCUMENTS

| | | |
|---|---|---|
| JP | 2005-139951 | 6/2005 |
| JP | 2007-032540 | 2/2007 |
| JP | P2007-064191 A | 3/2007 |
| JP | 2009-002301 | 1/2009 |
| JP | P2009-038883 | 2/2009 |
| JP | 2009-052417 | 3/2009 |
| JP | P2009-052442 A | 3/2009 |
| JP | P2009-052528 A | 3/2009 |

OTHER PUBLICATIONS

Japanese Office Action dated Dec. 20, 2011, issued in corresponding Japanese Application No. 2009-132007 with English Translation.
Japanese Office Action dated May 10, 2011, issued in corresponding Japanese Application No. 2009-132007 with English Translation.
Japanese Office Action dated Jun. 5, 2012, issued in corresponding Japanese Application No. 2009-132007 with English Translation.

* cited by examiner

Primary Examiner — John Kwon
(74) Attorney, Agent, or Firm — Nixon & Vanderhye PC

(57) ABSTRACT

When performing a learning control of a fuel injection quantity, a fuel injection control apparatus adds a pilot fuel injection during the working state of a diesel engine when a learning data item (as a fuel injection amount correction value) is calculated per cylinder and fuel pressure. The apparatus compares, based on a combustion stroke of a target cylinder, a work load obtained during an ordinary fuel injection with a work load obtained during the pilot fuel injection. The apparatus calculates a learning data item for the target cylinder in order to correct an actual fuel injection quantity in the target cylinder with the learning data item so that the actual fuel injection quantity approaches a target fuel injection quantity.

7 Claims, 5 Drawing Sheets

LEARNING DATA TABLE G

| | CYLINDERS | | | |
|---|---|---|---|---|
| | #1 | #2 | #3 | #4 |
| FUEL PRESSURE ↓ | G11 | G12 | G13 | G14 |
| | G21 | G22 | G23 | G24 |
| | ⋮ | ⋮ | ⋮ | ⋮ |
| | Gn1 | Gn2 | Gn3 | Gn4 |

ORDINARY FUEL INJECTION

ORDINARY FUEL INJECTION
+
LEARNING FUEL INJECTION

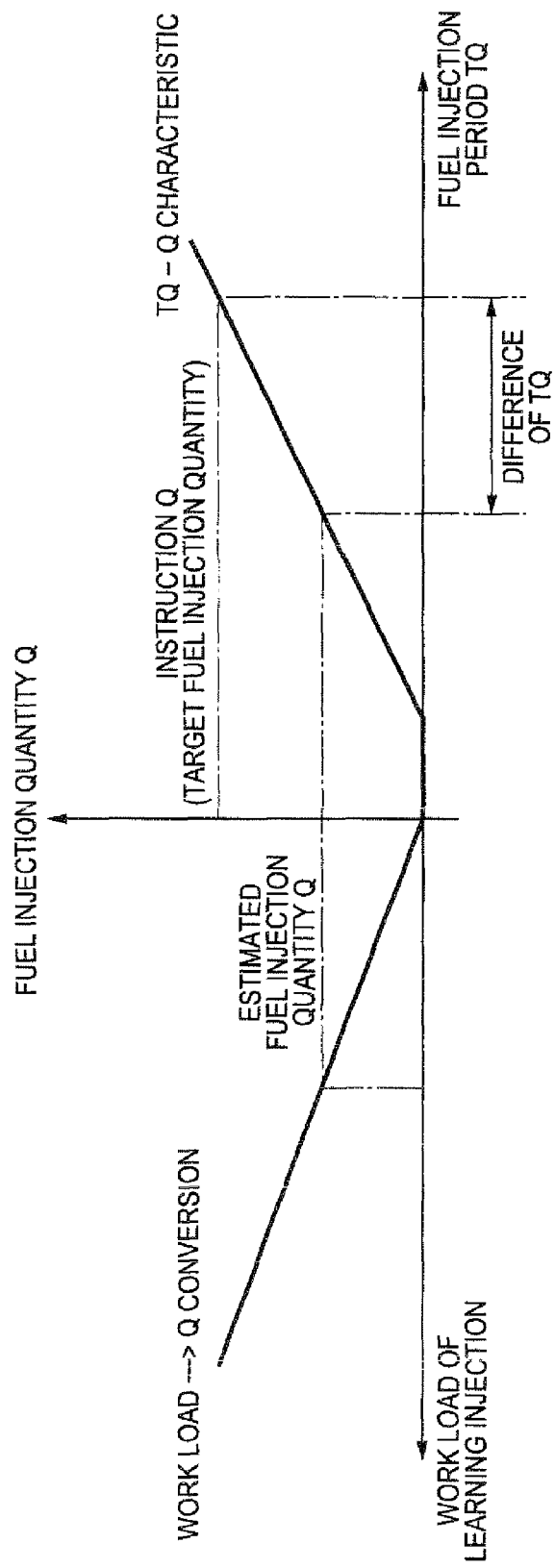

FUEL INJECTION CONTROL APPARATUS FOR INTERNAL COMBUSTION ENGINES

CROSS-REFERENCE TO RELATED APPLICATION

This application is related to and claims priority from Japanese Patent Application No. 2009-132007 filed on Jun. 1, 2009, the contents of which are hereby incorporated by reference.

BACKGROUND OF THE INVENTION

1. Field of the Invention

The present invention relates to a fuel injection control apparatus for internal combustion engines, which performs a learning control process to learn a difference between a fuel injection quantity and an instructed fuel injection quantity through a fuel injection valve.

2. Description of the Related Art

It is known for conventional diesel engines for vehicles to perform an additional fuel injection (such as a pilot injection, a pre injection, and a post injection) to inject a smaller quantity of fuel before or after performing a main fuel injection in order to suppress combustion noises and to decrease a quantity of NOx contained in an exhaust gas emitted from a diesel engine.

Because such an additional injection process injects a very small quantity of fuel per fuel injection, the fuel injection accuracy drastically decreases when a fuel injection quantity of an actual fuel injection is different from a fuel injection quantity of an instructed fuel injection (or a target fuel injection). As a result, it would be difficult to obtain desired effect generated by the additional fuel injection with a small fuel quantity which is performed before or after the main fuel injection.

In order to solve the above conventional problem, a conventional improved technique has been proposed, which performs a fuel injection quantity learning control. In the fuel injection quantity learning control, the conventional technique performs an additional fuel injection through a fuel injection valve, which is independent from the main fuel injection, during deceleration of a diesel engine when a fuel quantity of the main fuel injection becomes zero.

The conventional technique then estimates the fuel injection quantity in such an additional fuel injection based on the change of rotation speed of the diesel engine generated by performing the additional fuel injection, calculates a difference between the estimated fuel injection quantity and an instructed fuel injection quantity, and sets the difference value as a correction value (or a learning value) to the instructed fuel injection quantity. For example, Japanese patent laid open publication No. JP 2005-139951 has disclosed such a conventional technique.

However, the above conventional technique performs the fuel injection quantity learning control only during deceleration of the diesel engine (in other words, the timing to cut the fuel supply ("fuel cut timing")) when the fuel injection quantity to be supplied to the diesel engine becomes zero. Therefore because the number of opportunities to learn the fuel injection quantity is small, it is difficult for the conventional technique to sufficiently perform the fuel injection quantity learning for the fuel injection valve of each of the cylinders of the diesel engine under a full injection condition before the difference between the fuel injection quantity and the instructed fuel injection quantity becomes within an allowable range That is, the conventional fuel injection quantity learning control of the conventional technique described above calculates, as a learning value, the difference between the fuel injection quantity and the instructed fuel injection quantity generated in each of the cylinders per elapse of time. Because the difference between the fuel injection quantity and the instructed fuel injection quantity is changed according to the fuel pressure change to be supplied to the fuel injection valve, it is necessary to perform the fuel injection quantity learning control under such a full fuel injection condition.

However, the conventional technique has a fewer opportunities to perform the process of the fuel injection quantity learning control under the full fuel injection condition. Because it takes a lot of times to perform the fuel injection quantity learning control under the full injection condition by the conventional technique, it is difficult to update all of learning data (or correction data) by the elapsed time before a difference between a fuel injection quantity and an instructed fuel injection quantity of the fuel injection valve exceeds a value within the allowable range.

SUMMARY OF THE INVENTION

It is an object of the present invention to provide a fuel injection control apparatus for internal combustion engines capable of performing a fuel injection quantity learning control to learn a difference between a fuel injection quantity and an instructed fuel injection quantity of a fuel injection valve of the internal combustion engine during an ordinary working period of the internal combustion engine.

To achieve the above purposes, the present invention provides a fuel injection control apparatus has a fuel injection pattern changing means, a working state change calculating means, and a learning data calculating means. The fuel injection pattern changing means changes a fuel injection pattern during a predetermined time period when a learning condition is established during the working of the internal combustion engine. Further, the working state change calculating means compares a working state of the internal combustion engine when the fuel injection pattern changing means changes the fuel injection pattern with a working state of the internal combustion engine when the fuel injection pattern changing means does not change the fuel injection pattern. The working state change calculating means then calculates a change value of the working state of the internal combustion engine generated by the change of the fuel injection pattern performed by the fuel injection pattern changing means.

Further, the learning data calculating means estimates a change value of the fuel injection quantity which is generated by the change of the fuel injection pattern performed by the fuel injection pattern changing means. The learning data calculating means then calculates a difference value between the estimated change value of the fuel injection quantity and a reference change value corresponding to the change of the fuel injection pattern, which is used as a learning data item (or a correction data item) to be used in correcting the fuel injection quantity supplied by the fuel injection valve.

As described above, the fuel injection control apparatus according to the present invention changes the fuel injection pattern to supply a fuel through the fuel injection valve during the working of the internal combustion engine, and calculates, based on the change amount of the working state of the internal combustion engine generated by the change of the fuel injection pattern, the learning data item (or correction data item) which is used for correcting an incorrect fuel injection quantity caused by the difference between an actual fuel injection quantity and a target fuel injection quantity.

Accordingly, as compared with conventional techniques, the fuel injection control apparatus according to the present invention increases the frequency to execute the learning control process to calculate the learning data items (correction data items), and thereby makes it possible to correctly update the learning data items before increasing a difference value (in other words, a fuel injection error) between the actual fuel injection quantity and the instructed fuel injection quantity (target fuel injection quantity), which is caused by elapse of time of the fuel injection valve in the internal combustion engine.

Applying the fuel injection control apparatus according to the present invention to the internal combustion engines makes it possible to execute the fuel injection control process with high accuracy when compared with that of the conventional techniques.

Although the fuel injection pattern changing means temporarily changes the fuel injection pattern from the fuel injection valve during the working of the internal combustion engine in order to update the learning data items (to perform the learning control), it is necessary to prevent the working state of the internal combustion engine from greatly changing, which is caused by the change of the fuel injection pattern.

In order to achieve this request, it is sufficient for the fuel injection pattern changing means to add an additional fuel injection (such as a pilot fuel injection, a pre-fuel injection, and an after fuel injection), to be performed before or after a main fuel injection in order to change the fuel injection pattern.

Because this fuel injection control is performed without any changing the fuel injection quantity of the main fuel injection, it is possible to calculate the learning data item (correction data item) without a large change of the working state of the internal combustion engine.

In addition, in order to change the fuel injection pattern it is also possible for the fuel injection pattern changing means to change at least one of a fuel injection quantity to be used for setting the fuel injection pattern and a fuel injection timing to open the fuel injection valve.

On the other hand, because the working state change calculating means calculates the change amount of the working state of the internal combustion engine generated by the change of the fuel injection pattern performed by the fuel injection pattern changing means, it is sufficient for the working state change calculating means to perform the following control.

That is, the working state change calculating means detects the working state of the internal combustion engine by sampling the detection signals transferred from various types of sensors (for example, a rotary angle sensor, a cylinder pressure sensor, a combustion knock sensor, an air/fuel ratio sensor, a NOx sensor, etc.) to detect the working state of the internal combustion engine.

This detection makes it possible for the working state change calculating means to calculate a change amount of the working state based on a difference in working state (for example, a difference in a rotary angle quantity, a difference in a combustion pressure, a difference in the frequency of occurrences of combustion knock, a difference of A/F ratio, a difference in generation of NOx, etc.) between (a) when the fuel injection pattern changing means changes the fuel injection pattern and (b) when the fuel injection pattern changing means does not change the fuel injection pattern. The learning data calculating means thereby can calculate the learning data item (correction data item) based on the change amount of the working state obtained by the above control.

In addition, in order to correctly calculate the change amount of the working state of the internal combustion engine generated by the change of the fuel injection pattern performed by the fuel injection pattern changing means, it is sufficient for the working state change calculating means to perform the following control.

That is, in the fuel injection control apparatus as another aspect of the present invention, the working state change calculating means samples the detection signals transferred from the rotary angle sensor mounted on the internal combustion engine, detects the rotary speed of the internal combustion engine every predetermined angle period, and then calculates the work load of the power (explosion) stroke of the internal combustion engine based on the detected rotary speed. The calculated work load corresponds to the working state of the internal combustion engine.

Then, the working state change calculating means calculates the change amount of the working state generated by the change of the fuel injection pattern performed by the fuel injection pattern changing means based on a difference between the work load of the internal combustion engine calculated (a) when the fuel injection pattern changing means changes the fuel injection pattern and the work load of the internal combustion engine (b) when the fuel injection pattern changing means does not change the fuel injection pattern.

In the fuel injection control apparatus according to the present invention, the working state change calculating means calculates the change amount of the work load generated (a) when the fuel injection pattern changing means changes the fuel injection pattern and the work load of the internal combustion engine from the work load generated by the fuel combustion in the internal combustion engine by supplying a fuel through the fuel injection valve, namely, (b) when the fuel injection pattern changing means does not change the fuel injection pattern.

Thereby, the learning data calculating means can correctly estimate the changed quantity of the fuel injection quantity generated by the change of the fuel injection pattern performed by the fuel injection pattern changing means based on the calculated change amount of the work load.

That is, there is a possibility of occurrence of an error of the changed quantity of the estimated fuel injection amount by the influence of outer disturbance when the learning data calculating means simply estimates the changed quantity of the fuel injection quantity based on the change amount of the working state obtained by sampling the detection signals transferred from the working state detection sensors.

In order to solve this problem, because the working state change calculating means calculates the work load generated by the combustion of the fuel supplied through the fuel injection valve, it is possible to estimate the changed quantity of the fuel injection quantity based on the change amount of the work load with high accuracy. This makes it possible to increase the calculation accuracy to calculate the learning data item (or correction data items, namely, fuel injection quantity correction values, and more specifically, a correction data item regarding the electric power supply period to supply electric power to the fuel injection valve, for example).

The working state change calculating means calculates the work load of the internal combustion engine by the following method. That is, the working state change calculating means:

(a1) performs the filtering of the rotary speed of the internal combustion engine with a band filter having the power period (or explosion period) of the diesel engine, where the rotary speed is detected every predetermined rotary angle;

(a2) performs the calculation of a momentary torque based on the filtered rotary speed; and (a3) performs the integration of the calculated momentary torque during the power period of the target cylinder in the learning process.

Because the above calculation process to calculate the work load of each of the cylinders is well known, the detailed explanation of the calculation process is omitted here. For example, Japanese patent laid open publication NO. 2007-32540 has disclosed such a calculation process.

Because the internal combustion engine is a multi cylinder internal combustion engine, when the fuel injection valve is placed every cylinder, it is possible to calculate the learning data item (or correction data item) every fuel injection valve, or to calculate a common learning data item (or common correction data item) which is commonly used for all of the cylinders.

In order to calculate the learning data item for the fuel injection valve placed in the corresponding cylinder in one to one correspondence, the fuel injection pattern changing means changes the fuel injection pattern every cylinder of the internal combustion engine. The working state change calculating means detects a working state of the internal combustion engine generated by the power stroke (or explosion stroke) every cylinder where the fuel injection pattern changing means changes the fuel injection pattern, as the working state of the internal combustion engine (a) when the fuel injection pattern changing means changes the fuel injection pattern and (b) when the fuel injection pattern changing means does not change the fuel injection pattern. The working state change calculating means compares those working states in order to calculate the change amount of the working state of the internal combustion engine every cylinder.

The learning data calculating means estimates the changed quantity of the fuel injection quantity based on the change amount of the working state calculated every cylinder of the internal combustion engine by the working state change calculating means, and calculates the learning data item every cylinder of the internal combustion engine based on the estimated change quantity of the fuel injection quantity and the reference change amount.

In the fuel injection control apparatus as another aspect of the present invention, the working state change calculating means estimates the working state every cylinder of the internal combustion engine (a) when the fuel injection pattern changing means changes the fuel injection pattern and (b) when the fuel injection pattern changing means does not change the fuel injection pattern. This makes it possible to calculate the learning data item to be used for correcting the fuel injection quantity error generated by the fuel injection valve of each cylinder, and possible to set the learning data item with high accuracy based on the characteristics of the fuel injection valve of each cylinder.

On the other hand, the following fuel injection control apparatus calculates the learning data item by almost performing the same operation of the fuel injection control apparatus previously described. In particular, on calculating the change amount of the working state every cylinder, the working state change calculating means compares the working state in the power stroke in the cylinder where the fuel injection pattern changing means changes the fuel injection pattern with the working state in the power stroke in the cylinder where the fuel injection pattern changing means does not change the fuel injection pattern.

That is, in the fuel injection control apparatus as another aspect of the present invention, when calculating the learning data item in order to cause an incorrect fuel injection quantity through the fuel injection valve every cylinder, the learning data calculating means uses the working state in the power stroke of the cylinder (a) where the fuel injection pattern changing means changes the fuel injection pattern in the fuel injection valve of the cylinder and the working state in the power stroke of the cylinder (b) where the fuel injection pattern changing means does not change the fuel injection pattern. This makes it possible to calculate the change amount of the working state of the internal combustion engine, and to calculate the learning data item in a short time when compare with the case to detect the working state in the same cylinder of the internal combustion engine.

As a result, although the accuracy of the learning data item which is set for the fuel injection valve mounted to every cylinder of the internal combustion engine is slightly decreased when compared with the fuel injection control apparatus previously described, the fuel injection control apparatus described above can calculate the learning data item with a short time length, and complete the learning control for all of the cylinders of the internal combustion engine within a short time period.

Although the fuel injection control apparatus according to the present invention calculates the change amount of the working state of the target cylinder where the fuel injection pattern is changed based on the working state, as a reference value, which is generated in the power stroke of non-target cylinder. This is based on the viewpoint where there is not a large difference in fuel injection characteristics between all of the cylinders of the multi cylinder type internal combustion engine, and there is not a large difference between the learning data items in all of the cylinders.

In the fuel injection control apparatus as another aspect of the present invention, the fuel injection pattern changing means changes the fuel injection pattern for all cylinder or some cylinders of the internal combustion engine, and the working state change calculating means calculates a change amount of the working state of the internal combustion engine generated by changing the fuel injection pattern by the fuel injection pattern changing means by comparing (c1) with (c2):

(c1) an average value of the working state of the internal combustion engine generated during the power stroke of all cylinders or some cylinders in the internal combustion engine (a) when the fuel injection pattern changing means changes the fuel injection pattern, with (c2) an average value of the working state of the internal combustion engine generated during the power stroke of all cylinders or some cylinders in the internal combustion engine (b) when the fuel injection pattern changing means does not change the fuel injection pattern.

The learning data calculating means estimates a change quantity of the fuel injection quantity based on the change amount of the working state calculated by the working state change calculating means, and calculates a learning data item to be commonly used for all cylinders.

That is, because there is not a large difference in fuel injection characteristics between all of the cylinders of the multi cylinder type internal combustion engine, the fuel injection pattern changing means in the fuel injection control apparatus changes the fuel injection pattern of all cylinders or some cylinders of the internal combustion engine. The working state change calculating means in the fuel injection control apparatus obtains the change amount of the working state generated, when the fuel injection pattern is changed, based on the average value of the working state in the power stroke of the cylinders where the fuel injection pattern is changed. The learning data calculating means in the fuel injection control apparatus finally calculates the common learning data item which is commonly used for all cylinders of the internal combustion engine.

According to the fuel injection control apparatus of the present invention, although the suppression effect to correct the fuel injection quantity error is decreased, it is possible to further decrease the calculation time period to obtain the learning data item after the learning condition is established when compared with that of the fuel injection control apparatus as different aspects of the present invention previously described.

BRIEF DESCRIPTION OF THE DRAWINGS

A preferred, non-limiting embodiment of the present invention will be described by way of example with reference to the accompanying drawings, in which:

FIG. 6 is a map showing a relationship (a conversion characteristic) between a fuel injection work load and a fuel injection quantity Q to be used for estimating an actual fuel injection quantity.

DETAILED DESCRIPTION OF THE PREFERRED EMBODIMENTS

Figures 1, 2:
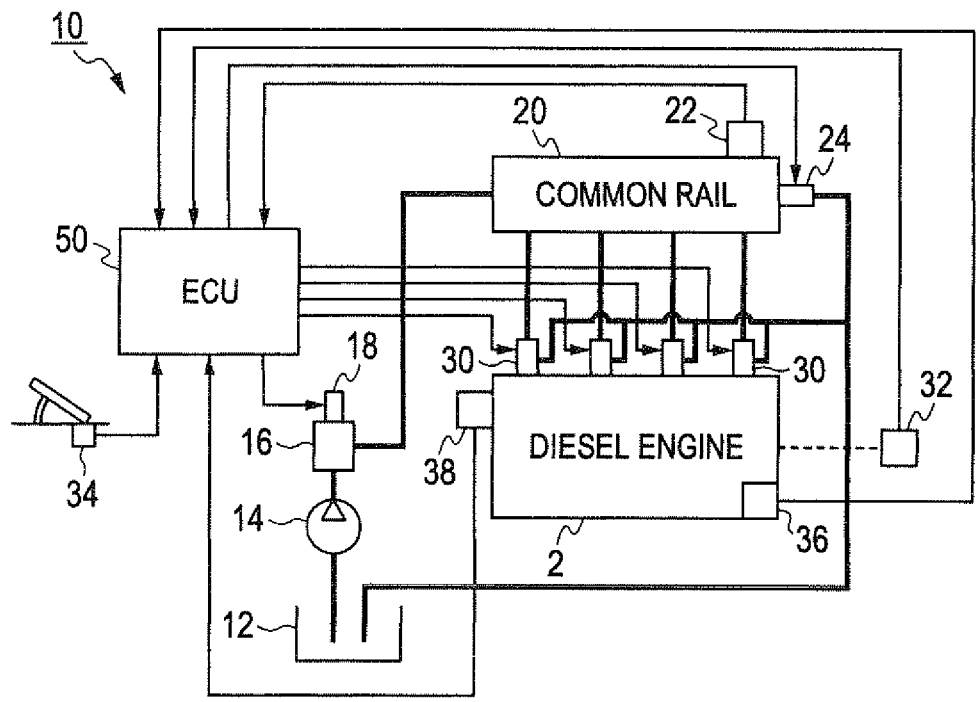
FIG. 1 is a schematic view showing an entire structure of a fuel injection system having a fuel injection control apparatus according to an embodiment of the present invention.
FIG. 2 is a schematic view showing a learning data table which shows a relationship between a learning data item, a fuel pressure, and a cylinder.

Hereinafter, various embodiments of the present invention will be described with reference to the accompanying drawings. In the following description of the various embodiments, like reference characters or numerals designate like or equivalent component parts throughout the several diagrams.

Embodiment

A description will now be given of the fuel injection system 10 equipped with the fuel injection control apparatus according to the embodiment of the present invention with reference to FIG. 1 to FIG. 6. This fuel injection system 10 is an accumulation type fuel injection system.

FIG. 1 is a schematic view showing an entire structure of the fuel injection system 10 having the fuel injection control apparatus according to the embodiment of the present invention.

For example, the fuel injection system 10 is a system to supply a fuel to the four cylinder diesel engine 2. The fuel injection system 10 is comprised of a common rail 20 which accumulates high pressure fuel, fuel injection valves 30, and an electric control unit (ECU) 50 which controls the entire operation of the fuel injection system 10. Each of the fuel injection valves injects a high pressure fuel supplied from the common rail 20 into the corresponding cylinder of the diesel engine 2.

The fuel injection system 10 further has a feed pump 14 and a high pressure pump 16. The feed pump 14 pumps up the fuel accumulated in a fuel tank 12. The high pressure pump 16 presses the fuel supplied from the feed pump 14 and then supplies the high pressure fuel into the common rail 20.

The high pressure pump 16 is a well known pump composed of a cam fixed to a cam shaft and a plunger, where the plunger performs a back and forth motion (or a reciprocating motion) according to the rotary motion of the cam in order to press the fuel in a compression chamber. The high pressure pump 16 has an adjusting valve to adjust the fuel quantity supplied from the feed pump 14 during an intake process to intake the fuel from the feed pump 14.

The common rail 20 has a pressure sensor 22 to detect the pressure (common rail pressure) of the inside of the common rail 20, and a pressure reducing valve 24 to decrease the fuel pressure in the common rail 20 by returning a part of the fuel accumulated in the common rail 20 to the fuel tank 12.

The diesel engine 2 is equipped with a rotary angle sensor 32, an acceleration sensor 34, a water temperature sensor 36, an intake air temperature sensor 38. The rotary angle sensor 32 generates a rotary angle signal every predetermined rotary angle (for example, 30° CA), the acceleration sensor 34 detects a stroke of the acceleration pedal of a vehicle when the driver of the vehicle depresses the acceleration pedal. The water temperature sensor 36 detects the temperature of a cooling water (cooling temperature THW). The intake air temperature sensor 38 detects a temperature of intake air (intake air temperature TA).

On the other hand, the ECU 50 is comprised of a CPU (central processing unit), a ROM (read only memory), a RAM (random access memory), etc.

The ECU 50 receives detection signals transferred form various types of sensors such as the pressure sensor 22 placed on the common rail 20, the above sensors 32, 34, 36, 38 mounted to the diesel engine 2. The ECU 50 controls the common rail pressure, the fuel injection quantity to be injected by the fuel injection valves 30, and the timing to inject a fuel through the fuel injection valves 30.

That is, the ECU 50 calculates a target pressure of the high pressure fuel stored in the common rail 20 based on the working state of the diesel engine 20. The ECU 50 controls an adjusting valve 18 and the pressure reducing valve 24 so that the common rail pressure Pc (in other words, the injection pressure of a fuel through the fuel injection valve 30) detected by the pressure sensor 22 becomes a desired pressure value. The ECU 50 further calculates a fuel injection quantity and a fuel injection time period based on the working state of the diesel engine 2. The ECU 50 supplies the electric power to the fuel injection valve 30 of each of the cylinders of the diesel engine 2 at a predetermined timing based on the calculation results so that the fuel injection valve 30 for each of the cylinders of the diesel engine 2 opens for a predetermined fuel injection time period TQ. This supplies a fuel of a desired quantity (or a fuel of an optimum quantity) to the cylinders. Thus, the ECU 50 performs the fuel injection control described above.

By the way, the actual fuel injection quantity Qact is changed according to a variation of injection characteristics of each of the fuel injection valves 30 when the fuel injection valve 30 injects a fuel during the fuel injection time period TQ. Further, the fuel injection characteristics of the fuel injection valve 30 are changed according to the elapse of time. This causes a difference between the actual fuel injection quantity Qact and the target fuel injection quantity Qtrg even if the ECU 50 determines the fuel injection time period TQ based on the instruction Q which indicates the target fuel injection quantity Qtrg.

The ECU 50 in the fuel injection control apparatus according to the embodiment of the present invention stores a learning data table G (or a correction data table G) into the ROM, for example. The learning data table G is composed of a plurality of learning data items G11, G12, . . . , Gn3, and Gn4 (see FIG. 2). The learning data items G11, G12, . . . , Gn3, and Gn4 correspond to fuel injection quantity correction values which will be explained later in detail.

Each of the learning data items corresponds to a fuel injection quantity correction value (more specifically, a correction data item regarding the period to supply electric power to the fuel injection valve 30) which corresponds to the difference between the actual fuel injection quantity Qact and the target fuel injection quantity Qtrg, previously described. The ECU 50 corrects the electric power supply period based on the learning data item in order for the actual fuel injection quantity Qact to approach the target fuel injection quantity Qtrg (instruction Q).

FIG. 2 is a schematic view showing the learning data table. This learning data table shows a relationship between a learning data item (G11, G12, . . . , Gn3, and Gn4), a fuel pressure, and a cylinder (#1 to #4).

As shown in FIG. 2, the learning data table G has a plurality of learning areas which store fuel injection quantity correction values (learning data items) G11, G12, . . . , Gn3, and Gn4. That is, each of the fuel injection quantity correction values (learning data items) G11, G12, . . . , Gn3, and Gn4 belongs to one of a plurality of learning areas. That is, the fuel injection quantity correction values (learning data items) G11, G12, . . . , Gn3, and Gn4 correspond to the learning areas in one-to one correspondence.

Those learning areas (that is, the fuel injection quantity correction values (learning data items) G11, G12, . . . , Gn3, and Gn4) are categorized based on a combination of the cylinder number #1 to #4 and fuel pressures (various common rail pressures Pc). The learning data table G is set in advance. The ECU 40 then updates the learning data items in the learning data table G during the working state of the diesel engine 2 based on the learning control process which will be explained later in detail.

During the fuel injection control, the ECU 50 determines a combination of a pre-fuel injection, a pilot fuel injection, and an after fuel injection according to the working state of the diesel engine 2 in order to obtain an optimum fuel injection pattern. The ECU 50 instructs the fuel injection valves 30 to open based on the determined optimum fuel injection pattern. Thus, the ECU 50 performs the main fuel injection, and one or more pre-fuel injection, the pilot fuel injection, and the after fuel injection before starting of or after completion of the main fuel injection.

When executing the learning fuel injection control process which will be explained in detail, the ECU 50 instructs the corresponding fuel injection valve 30 to perform the pilot fuel injection one time in addition to the ordinary fuel injection pattern in order to add the fuel injection quantity by the pilot fuel injection.

A description will now be given of the learning control process performed by the ECU 50 in order to update the learning data items with reference to FIG. 3. On updating the learning data items in the learning data table G, the ECU 50 calculates the learning data table G every learning area.

Figure 3:
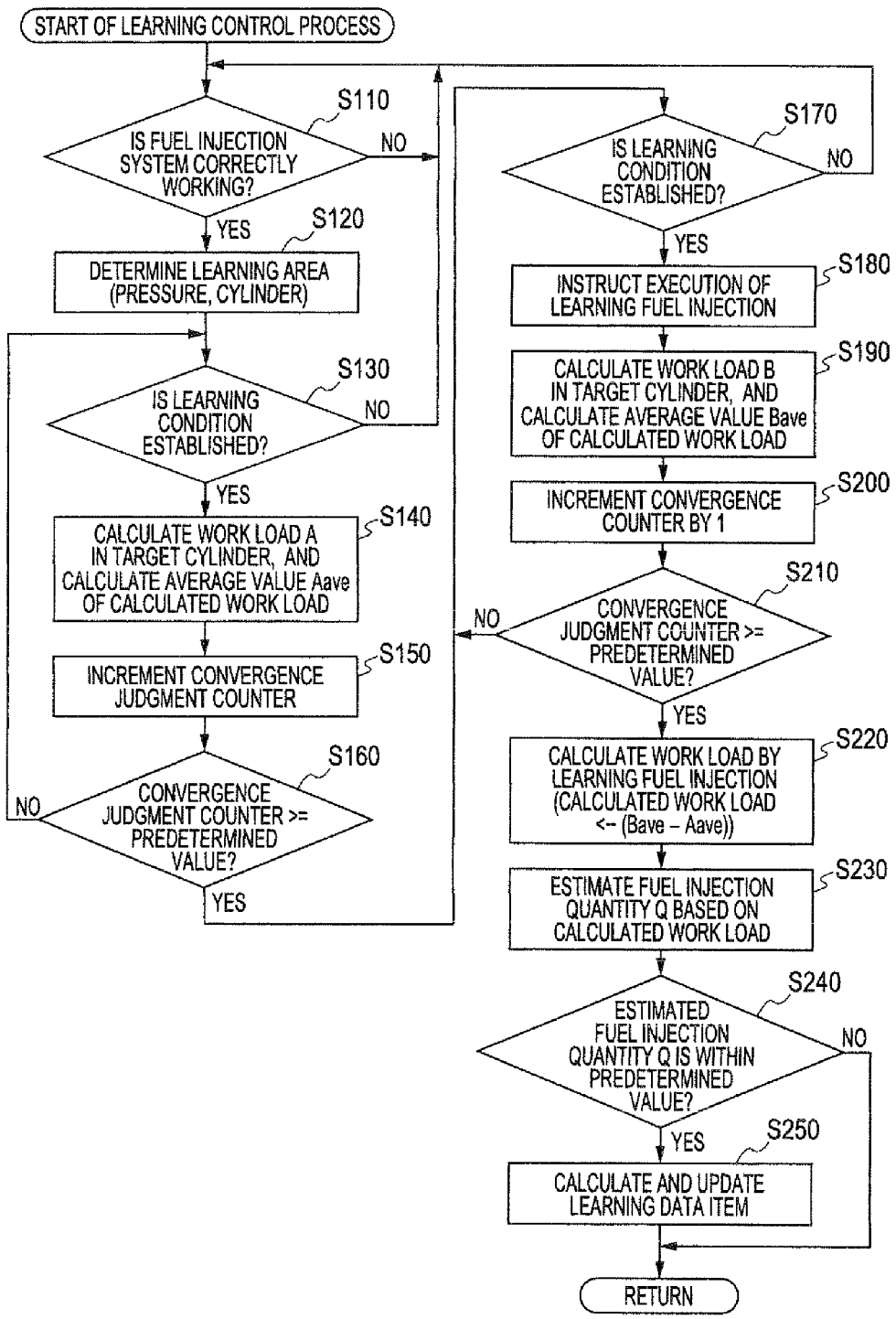
FIG. 3 is a flow chart showing the fuel injection quantity learning control process performed by the fuel injection control apparatus according to the embodiment shown in FIG. 1.

FIG. 3 is a flow chart showing the fuel injection quantity learning control process performed by the fuel injection control apparatus having the ECU 50 according to the embodiment shown in FIG. 1.

The ECU 50 executes the learning control process shown in FIG. 3 in addition to the common rail fuel pressure control and the fuel injection control during the working process of the diesel engine 2.

When starts the learning control process, the ECU 50 judges whether or not the fuel injection system is correctly working in step S110. When the judgment result in step S110 indicates negation ("NO" in step S110), the ECU 50 repeatedly performs the process in step S110 until the judgment result indicates affirmation ("YES" in step S110).

When the judgment result indicates affirmation ("YES" in step S110), the operation flow goes to step S120.

In step S120, the ECU 50 detects the current fuel pressure (common rail pressure Pc) based on a detection signal transferred from the pressure sensor 22. The ECU 50 determines, as a target to perform the learning area, the cylinder having the oldest learning data item (fuel injection quantity correction value) in the view of the detected common rail pressure Pc.

In step S130, the ECU 50 judges whether or not the learning condition in the selected learning area is established, When the judgment result in step S130 indicates the establishment of the learning condition, the operation flow goes to step S140.

On the other hand, when the judgment result in step S130 indicates that the learning condition is not established, the operation flow returns to step S110.

The learning condition is based on a state when the diesel engine 2 is not any transition state of acceleration or deceleration, and the cooling water temperature THW and the intake air temperature TA are within a predetermined range, that is, the working state of the diesel engine 2 is stable.

In step S130, the ECU 50 judges whether the diesel engine 2 is in a normal working state or not, and the learning condition is established or not based on the detection signals transferred from the rotary angle sensor 32, the acceleration sensor 34, the water temperature sensor 36, the intake air temperature sensor 38, etc.

Next, in step S140, the ECU 50 detects the rotary speed every predetermined rotary angle of a crank shaft of the diesel engine 2 based on the rotary angle signal transferred from the rotary angle sensor 32 at the target cylinder power (explosion) step which is determined as the target to perform the learning process in step S120. The ECU 50 calculates the work load A obtained by the power (explosion) step of the target cylinder based on the detected rotary speed. The ECU 50 calculates a work load average value Aave calculated in step S140 after the learning condition is established in step S130.

Figure 5:
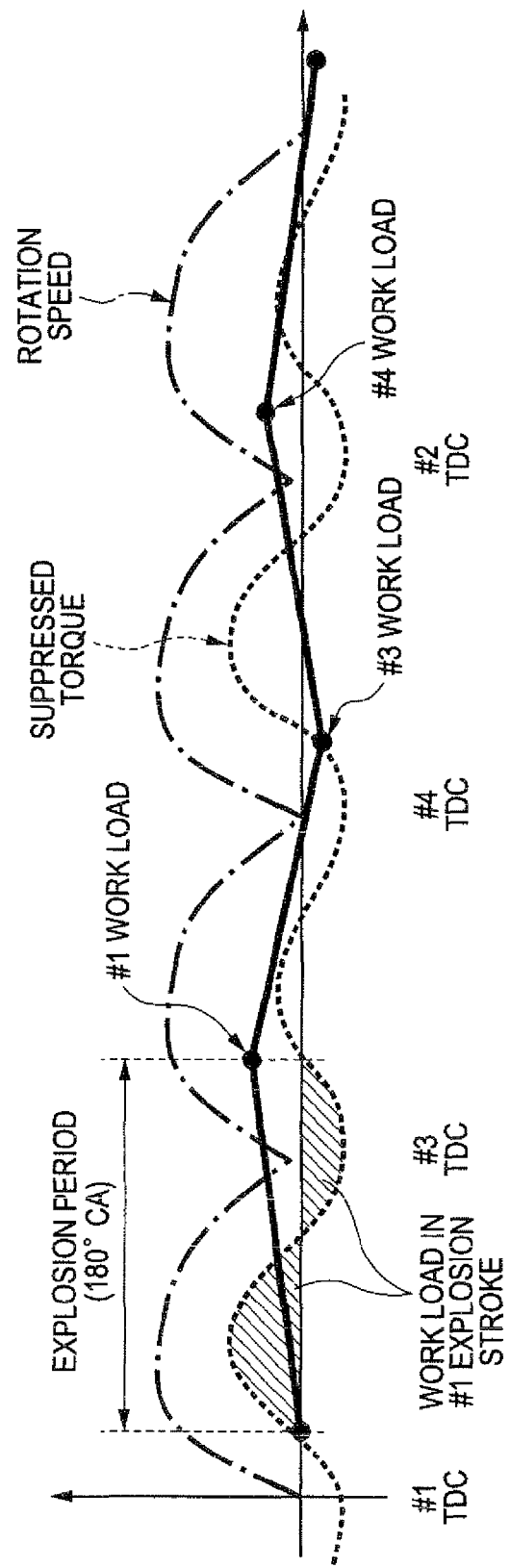
FIG. 5 is a view showing a process to calculate a work load obtained in a power stroke of each of the cylinders of the diesel engine.

FIG. 5 is a view showing the process to calculate the work load obtained in the power stroke (or explosion stroke) of each of the cylinders #1 to #4 of the diesel engine 2.

As shown in FIG. 5, the ECU 50 calculates the work load of each of the cylinders #1 to #4 of the diesel engine 2 by:

(a1) performing the filtering of the rotary speed with a band filter having the power period of the diesel engine 2 (180° CA in the embodiment because the diesel engine 2 has four cylinders #1 to #4), where the rotary speed is detected every predetermined rotary angle (for example, 30° CA) of the diesel engine 2 based on the rotary angle signal;

(a2) performing the calculation of a momentary torque based on the filtered rotary speed; and (a3) performing the integration of the calculated momentary torque during the power period of the target cylinder in the learning process.

Because such a calculation process to calculate the work load of each of the cylinders is well known, the detailed explanation of the calculation process is omitted here. For example, Japanese patent laid open publication NO. 2007-32540 has disclosed such a calculation process.

After completion of calculating the work load of the cylinder, the ECU 50 increments a value in a convergence judgment counter (for example, by 1) in order to count the number of calculation of the work load in step S150.

In step S160, the ECU 50 judges whether or not the value stored in the convergence judgment counter reaches a predetermined value which is set in advance.

The process in step S160 is the process to judge whether or not the work load (work load average value Aave) of the target cylinder is correctly calculated by the ordinary fuel injection under the ordinary working of the diesel engine 2 based on the calculation processes of not less than the predetermined number (for example, several ten times) to calculate the work load A and the work load average value Aave in step S140.

When the judgment result in step S160 indicates that the value stored in the convergence judgment counter does not reach the predetermined value, the operation flow goes to step S130. The ECU 50 executes the processes after step S130 again.

When the judgment result in step S160 indicates that the value stored in the convergence judgment counter reaches the predetermined value, the operation flow goes to step S170.

In step S170, the ECU 50 judges whether or not the learning condition is established, like the process in step S130.

When the judgment result in step S170 is affirmation ("YES" in step S170), the operation flow goes to step S180.

On the other hand, when the judgment result in step S170 is negation ("NO" in step S170), the operation flow returns to step S110.

Next, in step S180, the ECU 50 instructs the fuel injection valve 30 for the target cylinder to perform the learning fuel injection in order to perform the pilot fuel injection when the fuel injection valve 30 for the target cylinder performs the ordinary fuel injection so that the main fuel injection and the pilot fuel injection are executed in parallel.

Figure 4A:
FIG. 4A is a view showing an ordinary fuel injection process.
Figure 4B:
FIG. 4B is a view showing an injection for learning performed in addition to the ordinary fuel injection during learning process.

FIG. 4A is a view showing the ordinary fuel injection process. FIG. 4B is a view showing the learning fuel injection in addition to the ordinary fuel injection during the learning process.

As a result, when the ordinary fuel injection (which is a combination of the pre-fuel injection and the main fuel injection shown in FIG. 4A) is performed, the ECU 50 performs, after completion of the process in step S180, the fuel injection control with the fuel injection pattern which has the pilot fuel injection (learning fuel injection), the pre-fuel injection, and the main fuel injection is performed after completion of the process in step S180.

Next, in step S190, the ECU 50 detects the rotary speed of the diesel engine 2 every a predetermined rotary angle based on the rotary angle signal transferred from the rotary angle sensor 32 during the following power stroke of the target learning cylinder. The ECU 50 calculates the work load B of the target cylinder to be obtained in the power stroke of the target cylinder based on the detected rotary speed. The ECU 50 further calculates a work load average value Bave of the work load B which is calculated in step S190 after the judgment result in step S170 indicates that the learning condition is established.

The process to calculate the work load B and the work load average value Bave in step S190 is performed by the same manner in step S140. The calculated work load B and work load average value Bave are the values which are obtained by the ordinary fuel injection and the learning fuel injection. Other features of the work load B and the work load average value Bave are the same as the work load A and the work load average value Aave calculated in step S140.

After completion of calculating the work load B and the work load average value Bave in step S190, the ECU 50 increments the value of the convergence judgment counter (step 200). The convergence judgment counter counts the number of calculations to calculate the work load B.

In step S210, the ECU 50 detects whether or not the value in the convergence judgment counter has reached the predetermined value. The processes in steps S200 and S210 are the same as the process in steps S150 and S169.

In step S210, when the judgment result in step S210 indicates that the value in the convergence judgment counter does not reach the predetermined value, the operation flow returns to step S170. The ECU 50 then performs again the steps 170 to step S210.

On the other hand, when the judgment result in step S210 indicates that the value in the convergence judgment counter reaches the predetermined value, the operation flow goes to step S220.

In step S220, the ECU 50 calculates, as the work load on the learning fuel injection (pilot fuel injection), the difference between the work load average value Bave and the work load average value Aave as the work load obtained by the learning fuel injection (pilot fuel injection), where the work load average value on the fuel injection is calculated in the series of the processes in step S130 to S160 based on the ordinary fuel injection, and the work load average value Bave on the fuel injection is calculated in the series of the processes in step S170 to S210 based on the ordinary fuel injection and the learning fuel injection.

FIG. 6 is a map showing a relationship between a fuel injection work load and a fuel injection quantity to be used for estimating an actual fuel injection quantity Qest.

In step S230, the ECU 50 estimates an actual fuel quantity Qest (estimated actual fuel injection quantity Qact) injected from the fuel injection valve 30 based on the fuel injection work load calculated in step S220 by using the map shown in FIG. 6. The ECU 50 judges whether or not the estimated fuel injection amount Qest is within a predetermined range (normal range) in step S240.

When the judgment result in step S240 indicates negation ("NO" in step S240), that is, when the estimated fuel injection amount Qest is not within the predetermined range, the ECU 50 completes the learning control process shown in FIG. 3.

On the other hand, when the judgment result in step S240 indicates affirmation, that is, when the estimated fuel injection amount Qest is within the predetermined range ("YES" in step S240), the operation flow goes to step S250. In step S250, the ECU 50 calculates the learning data item in the current learning area, and updates the learning data item in the learning data table G shown in FIG. 2 with the calculated learning data item. The ECU 50 then completes the learning control process shown in FIG. 3.

As shown in FIG. 6, the ECU 50 calculates the learning data item in the learning data table G in step S250 by the following processes. The ECU 50 (a) calculates a fuel injection time period TQest which corresponds to the estimated fuel injection quantity Qest by using the map (or calculation equation) which shows the TQ-Q characteristics regarding the relationship between the fuel injection quantity and the fuel injection time period of the fuel injection valve 30, (b) calculates a difference between the calculated fuel injection time period TQest and an actual fuel injection time period TQact when the ECU 50 allows for the fuel injection valves to perform the learning fuel injection (pilot fuel injection); and (c) multiplies the calculated difference of the fuel injection time period and the number of calculations which is set in advance.

As described above in detail, the ECU 50 in the fuel injection system 10 according to the embodiment of the present invention performs the learning control process. In particular, when calculating the learning data item in the learning data table G every cylinder and fuel pressure of the diesel engine 2, the ECU 50 adds the learning fuel injection (pilot fuel injection) in addition to the main fuel injection for the target fuel injection valve. Further, the ECU 50 detects the work load of the target cylinder obtained in the combustion step during the ordinary fuel injection, and the work load of the target cylinder obtained in the combustion step during the learning fuel injection, and calculates a difference in work load between the ordinary fuel injection and the learning fuel injection, and then obtains the work load of the learning fuel injection based on the calculated difference. The ECU 50 finally calculates the learning data item (fuel injection quantity correction value) in the learning data table G in order to correct the current fuel injection quantity of the target fuel injection valve 30 based on the calculated learning data item.

When compare with the conventional fuel injection systems, the fuel injection system 10 according to the embodiment of the present invention makes it possible to increase the frequency of calculating the learning data items (fuel injection quantity correction values) and to correctly update the learning data items in the learning data table G corresponding to each of the fuel injection valves which also correspond to the cylinders of the diesel engine 2 before increasing the difference in fuel injection quantity between the actual fuel injection and the estimated fuel injection by the elapse of time of the fuel injection valve 30.

Using the fuel injection control apparatus (ECU 50) in the fuel injection control system according to the present invention makes it possible to perform the fuel injection control with high accuracy when compared with the conventional fuel injection system.

As described above, the ECU 50 corresponds to the fuel injection control apparatus. The process in step S180 corresponds to the fuel injection pattern changing means, the process of the series of step S130 to step S160, S170, and S190 to S220 correspond to a work change calculation means, and the process of the series of step S230 to step S250 correspond to a learning data item calculation means.

The concept of the present invention is not limited by the embodiment previously described. For example, it is possible for the fuel injection control apparatus according to the present invention to have the following modifications.

First Modification

In the embodiment previously described, the process in step S180 adds the step of performing the pilot fuel injection into the process for performing the ordinary fuel injection in order to change the current fuel injection pattern for the learning fuel control. The present invention is not limited by this. It is possible for the ECU 50 to add a process to perform a pre-fuel injection or an after fuel injection instead of adding the pilot fuel injection into the process in step S180. Further it is possible for the ECU 50 to change the fuel injection pattern based on the working state of the diesel engine 2.

Further, it is possible for the ECU 50 to perform the pilot fuel injection plural times when adding the pilot fuel injection in step S180 when the pilot fuel injection is performed during the ordinary fuel injection.

When the fuel injection pattern is changed in order to perform the learning control of the fuel injection quantity, it is not always to add the learning fuel injection. For example, it is possible to add a fuel injection amount of the learning fuel injection to the fuel injection amount which is calculated based on the working state of the diesel engine 2. Further, it is also possible to change the timing to inject a fuel in the ordinary fuel injection process.

Second Modification

In the embodiment of the present invention previously described, the ECU 50 calculates the work load obtained in the power stroke of the target cylinder in the learning control of the fuel injection quantity in order to calculate the change amount of the working state of the diesel engine 2 generated by adding the learning fuel injection into the ordinary fuel injection. The present invention is not limited by this. For example it is possible for the ECU 50 to calculate the change amount of the working state of the diesel engine 2 which is generated by the power stroke of the target cylinder by adding the learning fuel injection based on:

(1) the number of rotation or a change value of the number of rotation of the crank shaft of the diesel engine 2 obtained from the rotary angle sensor 32;

(2) a combustion pressure obtained from a cylinder inside pressure sensor;

(3) vibration, etc. of the diesel engine 2 obtained from a combustion knock sensor; or (4) detection signals transferred from various types of operation state detection sensors.

When calculating data items to be commonly used for all of the cylinders, as will be explained later, it is possible for the ECU 50 to perform sampling detection signals transferred from an air and fuel ration sensor (AIF sensor) and a NOx sensor which detects components contained in an exhaust gas emitted from the diesel engine 2 in order to calculate the change of the working state of the diesel engine 2.

Third Modification

In the embodiment of the present invention previously described, the ECU 50 calculates the work load of the power stroke of the target cylinder for the learning control of the fuel injection quantity every the ordinary fuel injection and the learning fuel injection in order to obtain the learning data items G11, G12, . . . , Gn3, and Gn4 (fuel injection quantity correction values) of each of the cylinders. However, the present invention is not limited by this. For example, it is possible for the ECU 50 to calculate the work load and its average value of each of the power stroke in the target cylinder and the power stroke in another cylinder after completion of the learning fuel injection, and for the ECU 50 to calculate the work load for the target cylinder for the learning control of the fuel injection quantity based on a difference between a plurality of the average values.

This makes it possible to calculate the work load when the learning fuel injection is not performed and the work load when the learning fuel injection is performed during the period to execute the learning fuel injection plural times. Further, it is thereby possible to decrease the time period to calculate the work load only when the learning fuel injection is executed, and to increase the frequency of updating the learning data items in the learning data table G.

Fourth Modification

It is not necessary to make and set the learning data items into the learning data table G for each cylinder. For example, it is possible to make and set common learning data items in the learning data table G which can be commonly used for all of the cylinders of the diesel engine 2. This case detects the work load obtained in the power stroke of all or a part of the cylinders as the target to perform the learning control of the fuel injection quantity, like the same process in steps S130 to S160 and steps S170 to S210 every ordinary fuel injection and learning fuel injection. The ECU 50 then calculates the average of the detected work load per target cylinder between all of the target cylinders or between the part of the cylinders in order to calculate the learning data item to be commonly used in all of the cylinders.

Fifth Modification

In the embodiment of the present invention previously described, the ECU 50 continuously performs plural times the process to calculate the work load A and the average value Aave during the ordinary fuel injection and the work load B and the average value Bave during the learning fuel injection. The present invention is not limited by the embodiment. It is possible to alternately perform the process to calculate the work load A and the process to calculate the work load B. Further, it is acceptable for the ECU 50 to calculate the average values Aave and Bave after completion of calculating a plurality of the work load A and B plural times.

Sixth Modification

The embodiment of the present invention previously described uses the power (explosion) period of 180° CA to calculate the work load for the four cylinder diesel engine 2. The power period becomes 120° CA when the diesel engine has six cylinders.

In the fuel injection system 10 according to the embodiment of the present invention previously described, each of the fuel injection valves 30 in the diesel engine 2 injects a fuel into a corresponding cylinder. The concept of the present invention can be applied to the fuel injection system for gasoline engines by the same manner previously described.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A fuel injection control apparatus which calculates a fuel injection quantity on the basis of a working state of an internal combustion engine, and adjusts fuel supply of fuel injection valves into corresponding cylinders of the internal combustion engine on the basis of a fuel injection pattern which is made on the basis of the calculated fuel injection quantity, the fuel injection control apparatus comprising:
    fuel injection pattern changing means which changes the fuel injection pattern during a predetermined time period when a learning condition is established during the working of the internal combustion engine;
    working state change value calculating means which compares the working state of the internal combustion engine (a) when the fuel injection pattern changing means changes the fuel injection pattern of the fuel injection valves with the working state of the internal combustion engine (b) when the fuel injection pattern changing means does not change the fuel injection pattern of the fuel injection valves, in order to calculate a change value of the working state of the internal combustion engine which is generated by the change of the fuel injection pattern by the fuel injection pattern changing means; and
    learning data calculating means which estimates a change value of the fuel injection quantity which is generated when the fuel injection pattern changing means changes the fuel injection pattern on the basis of the change value of the working state of the internal combustion engine calculated by the working state change value calculating means, and
    the learning data calculating means which calculates a difference value between the estimated change value of the fuel injection quantity and a reference change value corresponding to the change of the fuel injection pattern, as a learning data item to be used to correct the fuel injection quantity of the fuel injection valves,
    wherein the fuel injection pattern changing means detects that the learning condition is established when the working state of the internal combustion engine is stable without a transition state, and the fuel injection pattern changing means adds a fuel injection to be performed before or after a main fuel injection in order to change the fuel injection pattern when the detection result indicates that the learning condition is established.

2. The fuel injection control apparatus according to claim 1, wherein the fuel injection pattern changing means changes at least one of a fuel injection quantity to be used for setting the fuel injection pattern and a fuel injection timing to open the fuel injection valves, in order to change the fuel injection pattern.

3. The fuel injection control apparatus according to claim 1, wherein the working state change value calculating means detects the working state of the internal combustion engine (a) when the fuel injection pattern changing means changes the fuel injection pattern of the fuel injection valves by sampling a detection signal transmitted from working state detection sensors mounted to the internal combustion engine, and the working state of the internal combustion engine (b) when the fuel injection pattern changing means does not change the fuel injection pattern of the fuel injection valves by sampling a detection signal transmitted from working state detection sensors mounted to the internal combustion engine,
    the working state change value calculating means calculates a difference between the working state of the internal combustion engine obtained in both the cases (a) and (b), and calculates, on the basis of the calculated difference, a change amount of the working state of the internal combustion engine obtained when the fuel injection pattern changing means changes the fuel injection pattern.

4. The fuel injection control apparatus according to claim 1, wherein the working state change value calculating means detects a rotary speed of the internal combustion engine at a predetermined angle period by sampling a detection signal transmitted from a rotary angle sensor mounted to the internal combustion engine, as the working state of the internal combustion engine (a) when the fuel injection pattern changing means changes the fuel injection pattern of the fuel injection valves, and the working state of the internal combustion engine (b) when the fuel injection pattern changing means does not change the fuel injection pattern of the fuel injection valve,
    the working state change value calculating means calculates a momentary torque by filtering the detected rotary speed with a band filter of a power stroke of the internal combustion engine, and calculates a work load obtained by the power stroke of the internal combustion engine by integrating the momentary torque every power period of the internal combustion engine (a) when the fuel injection pattern changing means changes the fuel injection pattern and (b) when the fuel injection pattern changing means does not change the fuel injection pattern, and the working state change value calculating means calculates a difference between the work loads calculated in the cases (a) and (b) as a changed amount of the working state generated when the fuel injection pattern changing means changes the fuel injection pattern.

5. The fuel injection control apparatus according to claim 1, wherein the internal combustion engine is a multi-cylinder internal combustion engine where the fuel injection valves are placed for the cylinders in one to one correspondence, and the fuel injection pattern changing means changes the fuel injection pattern of each of the cylinders in the multi-cylinder in the internal combustion engine, the working state change value calculating means detects a working state of the internal combustion engine generated by the power stroke of each of the cylinders where the fuel injection pattern changing means changes the fuel injection pattern, as the working state of the internal combustion engine (a) when the fuel injection pattern changing means changes the fuel injection pattern of the fuel injection valves, and the working state of the internal combustion engine (b) when the fuel injection pattern changing means does not change the fuel injection pattern of the fuel injection valves, and the working state change value calculating means calculates the changed amount of the working state of each of the cylinders in the internal combustion engine by comparing the working states detected in the cases (a) and (b), and the learning data calculating means estimates a change quantity of the fuel injection quantity of each of the cylinders on the basis of the change amount of the working state of each of the cylinders of the internal combustion engine calculated by the working state change value calculating means, and the learning data calculating means calculates a learning data item of each of the cylinders of the internal combustion engine on the basis of the estimated change quantity of the fuel injection quantity and a reference change amount.

6. The fuel injection control apparatus according to claim 1, wherein the internal combustion engine is a multi-cylinder internal combustion engine where the fuel injection valves are placed for cylinders in one to one correspondence, and the fuel injection pattern changing means changes the fuel injection pattern of each of the cylinders in the multi-cylinder in the internal combustion engine, the working state change value calculating means calculates a change amount of the working state of each of the cylinders in the multi-cylinder in the fuel injection pattern change means changes the fuel injection pattern, by comparing the working state of the internal combustion engine generated in the power stroke of the cylinder (a) when the fuel injection pattern changing means changes the fuel injection pattern with the working state of the internal combustion engine generated in the power stroke of the cylinder (b) when the fuel injection pattern changing means does not change the fuel injection pattern, and the learning data calculating means estimates a change quantity of the fuel injection quantity of each of the cylinders on the basis of the change amount of the working state of each of the cylinders in the internal combustion engine calculated by the working state change value calculating means, and the learning data calculating means calculates a learning data item of each of the cylinders in the internal combustion engine on the basis of the estimated change quantity of the fuel injection quantity and a reference change amount.

7. The fuel injection control apparatus according to claim 1, wherein the internal combustion engine is a multi-cylinder internal combustion engine where the fuel injection valves are placed for cylinders in one to one correspondence, and the fuel injection pattern changing means changes the fuel injection pattern of all cylinders or specified cylinders in the internal combustion engine, the working state change value calculating means calculates a change amount of the working state of the internal combustion engine generated when the fuel injection pattern changing means changes the fuel injection pattern by comparing:

an average value of the working state of the internal combustion engine generated during the power stroke of all cylinders or specified cylinders in the internal combustion engine (a) when the fuel injection pattern changing means changes the fuel injection pattern of the fuel injection valves with an average value of the working state of the internal combustion engine generated during the power stroke of all cylinders or specified cylinders in the internal combustion engine (b) when the fuel injection pattern changing means does not change the fuel injection pattern of the fuel injection valves, and the learning data calculating means estimates a change quantity of the fuel injection quantity on the basis of the change amount of the working state calculated by the working state change value calculating means, and the learning data calculating means calculates a learning data item to be commonly used for all of the cylinders in the internal combustion engine on the basis of the estimated change quantity of the fuel injection quantity and a reference change amount.

* * * * *